US009950927B2

(12) United States Patent
Oates et al.

(10) Patent No.: US 9,950,927 B2
(45) Date of Patent: Apr. 24, 2018

(54) METHOD OF SUPPLYING HYDROGEN THROUGH AN INTEGRATED SUPPLY SYSTEM

(71) Applicants: Rommel M. Oates, Spring, TX (US); Solomon A. Dadebo, Spring, TX (US); Douglas Prior, Lake View, NY (US)

(72) Inventors: Rommel M. Oates, Spring, TX (US); Solomon A. Dadebo, Spring, TX (US); Douglas Prior, Lake View, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/973,790

(22) Filed: Dec. 18, 2015

(65) Prior Publication Data
US 2017/0174512 A1    Jun. 22, 2017

(51) Int. Cl.
*C01B 3/02*     (2006.01)
*B65G 5/00*     (2006.01)

(52) U.S. Cl.
CPC . *C01B 3/02* (2013.01); *B65G 5/00* (2013.01)

(58) Field of Classification Search
CPC ...................................................... B65G 5/00
USPC ........................................................ 700/283
See application file for complete search history.

(56) References Cited

U.S. PATENT DOCUMENTS

| | | | |
|---|---|---|---|
| 2,878,165 A | 3/1959 | Cottle | |
| 3,438,203 A | 4/1969 | Lamb et al. | |
| 3,807,181 A | 4/1974 | Kuhne | |
| 4,025,321 A | 5/1977 | Anderson et al. | |
| 4,117,684 A | 10/1978 | Hendrix | |
| 4,183,369 A | 1/1980 | Thomas | |
| 4,353,214 A | 10/1982 | Gardner | |
| 4,365,978 A | 12/1982 | Scott | |
| 4,444,727 A | 4/1984 | Yanagihara | |
| 4,577,999 A | 3/1986 | Lindorfer et al. | |
| 4,592,677 A | 6/1986 | Washer | |
| 4,626,131 A | 12/1986 | Glew et al. | |
| 4,725,381 A | 2/1988 | Pinto | |
| 4,830,056 A | 5/1989 | Chamberlain | |
| 5,511,905 A | 4/1996 | Bishop et al. | |

(Continued)

FOREIGN PATENT DOCUMENTS

| | | |
|---|---|---|
| JP | 58 191399 A | 11/1983 |
| WO | WO 02/097321 A1 | 12/2002 |

OTHER PUBLICATIONS

Praxair, Praxair + SMR Energy Performance Management, Oct. 2010, retreived from http://www.praxair.co.in/-/media/praxairus/documents/specification-sheets-and-brochures/industries/refining/p10381-praxair-and-smr-energy-performance-management1.pdf?la=en on Oct. 27, 2016.*

(Continued)

*Primary Examiner* — Ziaul Karim
*Assistant Examiner* — Joshua Sanders
(74) *Attorney, Agent, or Firm* — Lurie A. Schwartz (57) ABSTRACT

The present invention relates generally to a method for supplying high purity hydrogen through a hydrogen supply system comprising in fluid communication one or more storage caverns, multiple hydrogen production sources, and a pipeline distribution system capable of delivering hydrogen to a plurality of hydrogen demand points which coordinates the operation of the cavern, hydrogen plants, and pipeline distribution system to meet the real time dynamic demand profile.

15 Claims, 7 Drawing Sheets

(56) References Cited

U.S. PATENT DOCUMENTS

| | | | |
|---|---|---|---|
| 5,526,280 | A | 6/1996 | Consadori et al. |
| 5,669,734 | A | 9/1997 | Becnel, Jr. et al. |
| 5,842,519 | A | 12/1998 | Sydansk |
| 6,080,306 | A | 6/2000 | Falkner |
| 6,503,299 | B2 | 1/2003 | Baksh et al. |
| 6,511,528 | B1 | 1/2003 | Lansbarkis et al. |
| 6,576,138 | B2 | 6/2003 | Sateria et al. |
| 6,581,618 | B2 | 6/2003 | Hill et al. |
| 6,880,348 | B2 | 4/2005 | Bishop et al. |
| 7,078,011 | B2 | 7/2006 | Morrow et al. |
| 7,152,675 | B2 | 12/2006 | Heard |
| 7,438,079 | B2 | 10/2008 | Cohen et al. |
| 8,425,149 | B2 | 4/2013 | Drnevich |
| 8,690,476 | B2 | 4/2014 | Oates |
| 8,757,926 | B2 | 6/2014 | Drnevich |
| 8,950,419 | B2 | 2/2015 | Oates et al. |
| 9,109,418 | B1 | 8/2015 | Norris |
| 2004/0059692 | A1* | 3/2004 | Hill .................. B65G 5/00 705/412 |
| 2004/0123738 | A1 | 7/2004 | Spencer |
| 2005/0220704 | A1 | 10/2005 | Morrow et al. |
| 2006/0216811 | A1 | 9/2006 | Cunningham et al. |
| 2008/0243310 | A1* | 10/2008 | Esposito .......... G05B 13/042 700/268 |
| 2009/0010714 | A1 | 1/2009 | Bishop |
| 2009/0028644 | A1 | 1/2009 | Lourenco et al. |
| 2009/0184517 | A1 | 7/2009 | Mukai |
| 2009/0265292 | A1 | 10/2009 | Harper |
| 2010/0101789 | A1 | 4/2010 | Dickinson et al. |
| 2010/0163804 | A1 | 7/2010 | Schenck |
| 2010/0200229 | A1 | 8/2010 | Jefferd |
| 2011/0305515 | A1 | 12/2011 | Drnevich |
| 2012/0259471 | A1* | 10/2012 | De Ridder .......... F01K 13/02 700/282 |
| 2013/0213479 | A1 | 8/2013 | Oates et al. |
| 2013/0315669 | A1 | 11/2013 | Oates |
| 2013/0336721 | A1 | 12/2013 | McBride et al. |
| 2014/0161533 | A1 | 6/2014 | Oates |
| 2014/0241802 | A1 | 8/2014 | Drnevich |
| 2015/0101672 | A1 | 4/2015 | Oates et al. |
| 2015/0185716 | A1* | 7/2015 | Wichmann .......... F01K 13/02 700/287 |
| 2016/0060038 | A1 | 3/2016 | Oates |
| 2016/0089705 | A1 | 3/2016 | Oates |

OTHER PUBLICATIONS

16 Tex. Admin. Code§ 3.97 (2007); Id. (1994).
2006 International Pipeline Conference materials.
Adams, J., TransGas Limited "Natural Gas Salt Cavern Storage Operating Pressure Determination". Petroleum Society of CIM, Paper No. 97-180. Presented at Seventh Petroleum Conf. of S. Saskatchewan Section, the Petroleum Society of CIM (Oct. 19-22, 1997) 14 pages.
ASTM E534-91. "Standard Test Methods for Chemical Analysis of Sodium Chloride". (Published Oct. 1991) 122 pgs.
Bear, Jacob. "Dynamics of Fluids in Porous Media". American Elsevier Publishing Co., Inc. New York. (No date available). p. 136.
Bérest, P. et al. "Salt Permeability Testing—2001-8-SMRI—Part 1—The Influence of Permeability and Stress on Spherical Hollow Salt Samples". Solution Mining Research Inst. Research Project Report No. 20901-8-SMRI (Oct. 2001). 15 pgs.
Bérest, P. et al. "Salt Permeability Testing—2001-8-SMRI—Part 2—The Influence of Permeability and Stress on Spherical Hollow Salt Samples". Solution Mining Research Inst. Research Project Report No. 20901-8-SMRI (Oct. 2001). 11 pgs.
Breele, Y. et al. "Technico-Economic Study of Distributing Hydrogen for Automotive Vehicles"; International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10.1016/0360-3199(79)90005-3 (retrieved on Jan. 1, 1979) p. 297-p. 299; Figure 2.
Brodsky, Nancy S. "Crack Closure and Healing Studies in WIPP Salt Using Compressional Wave Velocity and Attenuation Measurements: Test Methods and Results". Sandia National Laboratories, Contract No. 23-8484. SAND90-7076, (Printed Nov. 1990), 40 pgs.
Brouard et al. "Onset of Tensile Effective Stresses in Gas Storage Caverns". Solution Mining Research Institute, Fall 20907 Technical Meeting, Halifax, Canada (Oct. 8-10, 2007) 18 pgs.
Carter, et al. "Creep of Rocksalt". Elsevier Scientific Publishing Co., Amsterdam. Tectonophysics, 92 (1983) pp. 275-333.
CGA G-5.3:1997 Commodity Specification for Hydrogen, Fourth Edition, by Compressed Gas Association, Inc. ("CGA Spec").
Chevronphillips Hydrogen Cavern, Clemens Terminal, Slides (No date available). 15 slides.
Costin et al. "Creep Healing of Fractures in Rock Salt". Issued by Sandia National Laboratories, SAND80-0392, Published by National Technical Information Service, US Dept. of Commerce. (Sep. 29, 1980) 33 pgs.
CSA Standard Z341.1-06 "Reservoir Storage". Canadian Standards Assoc., (Dec. 2006) 44 pgs.
CSA Standard Z341.2-06 "Salt Cavern Storage". Canadian Standards Assoc., (Dec. 2006) 59 pgs.
CSA Standard Z341.Series 06 "Storage of Hydrocarbons in Underground Formations". Canadian Standards Assoc., (Dec. 2006) 17 pgs.
Durup, Jean Gérard. "Long-Term Tests for Tightness Evaluations with Brine and Gas in Salt (Field Test No. 2 with Gas)". Research Project Report No. 94-0002-S. SMRI Research and Development Project Report. Presented at 1994 Fall Meeting, Hannover, Germany, 36 pgs.
ERC Guide. "Natural Gas Storage in Salt Caverns—A Guide for State Regulators". Prepared by Energy Resources Committee of the Interstate Oil and Gas Compact Commission (Reprinted Feb. 1998). 68 pgs.
Evans, D.J. 2007. An appraisal of Underground Gas Storage technologies and incidents, for the development of risk assessment methodology. British Geological Survey Open Report, OR/07/023, 288 pgs.
Foh, Stephen et al. "Underground Hydrogen Storage Final Report". Institute of Gas Technology. Department of Energy and Environment, Brookhaven National Laboratory, Upton, NY, (Dec. 1979) 283 pgs.
Fuenkajorn et al. "Dilation-Induced Permability Increase Around Caverns in Salt". Rock Mechanics, Nelson & Laubach (eds) © 1994 Balkema, Rotterdam, ISBN 90 54 10 380 8, 8 pgs.
H2 Salt Dome Storage System PFD, Sep. 9, 2003 ("PFD").
Handbook of Compressed Gases (Van Nostrand Reinhold Company)—Hardcover (1990), by Compressed Gas Association, Compressed Gas Association Staff, 3rd ed., ISBN: 0442218818,ISBN-13: 9780442218812 ("CGA Handbook").
Hansen et al. "Elasticity and Strength of Ten Natural Rock Salts". First Conf. on Mechanical Behaviour of Salt. Pennsylvania State Univ. (Nov. 9-11, 1981).
Hydrogen Reliability Salt Cavern Case Study Oil Sands Heavy Oil Technologies Conference and Exhibition—Jul. 14-16, 2009, Alberta Canada, available at <http://www.slideshare.net/chojsm1/hydrogen- reliability-cavern-storage>; Published Jul. 20, 2009 ("Slides").
Investment in Gulf Coast to expand facilities and services, Oct. 25, 2007 <http://www.gasworld.com/investment-in-gulf-coast-to-expand- facilities-and-services/2146.article> (last visited Date).
Jacoby et al. "Salt Domes As a Source of Geothermal Energy". Mining Engineering (May 1974) pp. 34-39.
Johnson et al. "Salt Deposits in the United States and Regional Geologic Characteristics Important for Storage of Radioactive Waste". Y/OWI/SUB—414/1 DE 85 013319, Prepared for the Office of Waste Isolation, Union Carbide Corp., Nuclear Div., US Dept. of Energy (Mar. 1978). 191 pgs.
Kelley J.H., and R. Hagler Storage, transmission and distribution of Hydrogen, Int. J. Hydrogen Energ., 5, 35-54, 1980 ("Kelly").
Lord, Anna S. et al., "A Life Cycle Cost Analysis Framework for Geologic Storage of Hydrogen: A User's Tool", Sandia Report (SAND2011-6221) Sandia National Laboratories (Sep. 2011), 60 pges.

(56) References Cited

OTHER PUBLICATIONS

Mahoney J.J. and Strachan, D.M. "Reduction of Sulfate by Hyrogen in Natural Systems: A Literature Review", Pacific Northwest Laboratory, Richland, VA (Jan. 1987, Rev. Jan. 1988).
Marks' Standard Handbook for Mechanical Engineers, 9th Edition (1987) (pp. 7-18-7-19); Publisher: The McGraw-Hill Companies; ISBN: 007004127X; ISBN-13: 9780070041271.
Moss Bluff Storage Cavern, Operations and Maintenance Manual, Sep. 16, 2003 ("Ops Manual").
Mullaly, M A C. "Underground Storage in Thin Salt Layers on Teesside" Solution Mining Research Institute Meeting Paper presented in Manchester, UK (Oct. 1982) 10 pgs.
Nieland, JD. (2008). Salt cavern Thermodynamics-Comparison Between Hydrogen, Natural Gas and Air Storage. SMRI Fall Meeting, Austin, Texas, 215-234.
Oil and Gas Docket No. 03-0238823, Examiner's Report and Proposal for Decision, Jul. 28, 2004 ("Permit Review".
Performance of Palladium Diffusers for Reliable Purification; (2002) Extended abstract of a paper presented at CS-MAX, San Jose, CA, Nov. 11-13 (pp. 141-143). ("Funke").
Pfeifle et al. "Correlation of Chemical Mineralogic, and Physical Characteristics of Gulf Coast Dome Salt to Deformation and Strength Properties". Solution Mining Research Inst., Research Project Report #94/0004-S (Jan. 1995) 116 pgs.
Popp et al. "Evolution of Dilatancy and Permeability in Rock Salt During Hydrostatic Compaction and Triaxial Deformation". Journal of Geophysical Research, vol. 106, No. B3 (Mar. 10, 2001) pp. 4061-4078.
Pottier, J.D. et al. "Mass Storage of Hydrogen"; NATO ASI Series. Series E, Applied Sciences; Hydrogen Energy System: Production and Utilization of Hydrogen and Future Aspects; (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132X, pp. 167-pp. 170; Figures 1-3, 8.
Praxair Commercializes Industry's Only Hydrogen Storage, Oct. 22, 2007 <http://www.praxair.com/news/2007/praxair-commercializes- industrys-only-hydrogen-storage> (last visited Date.
Praxair Extending Hydrogen Pipeline in Southeast Texas—Oil & Gas Journal, vol. 90(34) (1992) (Praxair pipeline.
Praxair Hydrogen salt cavern schematic from Praxair, Inc. Mechanical Integrity Test, Hydrogen Storage Cavern #1, Sabine Storage 7 Operations, Inc. Project 11-640, Jan. 10, 2012, p. 56 (Cavern Structure).
Praxair Hydrogen Storage Project, TRRC Hearing, Jun. 10, 2004 ("Permit Presentation").
Praxair, Inc. Mechanical Integrity Test, Hydrogen Storage Cavern#1, Sabine Storage 7 Operations, Inc. Project 11-640, Jan. 10, 2012 ("5YR MIT").
Prudential Equity Group Conference, Speaker: Stephen F. Angel, Executive Vice President, Sep. 22, 2005, <http://www.praxair.com/investor-relations/reports-filings-and- presentations/investor-presentations> (last visited Date).
Ratigan et al. "LPG Storage at Mont Belvieu, Texas: A Case History". SPE Advanced Technology Series, Reprinted from vol. 1, No. 1 (1993) pp. 204-209.
Ratigan et al. "Rock Mechanics Aspects of Natural Gas Storage in Domal Salt". Solution Mining Research Inst. Meeting Paper. Prepared for SMRI 1993 Fall Meeting, Lafayette, Louisiana (Oct. 25-26, 1993), 50 pgs.
Ratigan, Joe L. "Hydrogen Storage in Solution-Mined Caverns in Salt Domes". Presentation by Ratigan Engineering & Consulting LLA (No date available) 36 pgs.
Rezunenko et al. "Constructive and Operation of Rock-Salt Underground Helium Concentrate Storage", SMRI Fall Meeting (Oct. 3-6, 1999).
Stolten, Detlef, ed. Hydrogen and fuel cells: fundamentals, technologies and applications. John Wiley & Sons, 2010 ("Stolten").

Stormont et al. "Laboratory Study of Gas Permeability Changes in Rock Salt During Deformation". Int. J. Rock Mech. Sci. & Geomech. Abstract, vol. 29, No. 4 (1992) pp. 325-342.
Sutherland et al. "Argon Gas Permeability of New Mexico Rock Salt Under Hydrostatic Compression". Int. J. Rock Mech. Sci. & Geomech. Abstracts, vol. 17, Pergamon Press Ltd. (1980), pp. 281-288.
Tek, M. R. (1996). Natural gas underground storage: inventory and deliverability. PennWell Publishing. ISBN: 0878146148; ISBN-13:9780878146147 ("Tek").
Thoms et al. "Survey of Existing Caverns in U.S. Salt Domes". Solution Mining Research Institute Research Project No. 84-0002 (No date available) 47 pgs.
Thoms R. L. and Gehle, R.M. "A Brief History of Salt Cavern Use", Keynote Speech at Salt 2000 Conference (2000) no month.
USPTO Case IPR2015-01071, Patent Trial and Appeal Board Decision, Institution of Inter Partes Review, U.S. Pat. No. 7,078,011 B2.
USPTO Case IPR2015-01072, Patent Trial and Appeal Board Decision, Institution of Inter Partes Review, U.S. Pat. No. 7,078,011 B2.
USPTO Case IPR2015-01073, Patent Trial and Appeal Board Decision, Institution of Inter Partes Review, U.S. Pat. No. 7,078,011 B2.
USPTO Case IPR2015-01074, Patent Trial and Appeal Board Decision, Denying Institution of Inter Partes Review, U.S. Pat. No. 8,690,476 B2.
USPTO Case IPR2015-01075, Patent Trial and Appeal Board Decision, Denying Institution of Inter Partes Review, U.S. Pat. No. 8,690,476 B2.
Valenti, Richard M., Compressed Air Energy Storage (CAES) Act, KCC Rule Development, Kansas Corporation Commission, KCC Open Meeting, Issue 3—Final (Jun. 16, 2010) 49 pages.
Venter, R.D. et al; "Modelling of Stationary Bulk Hydrogen Storage Systems"; International Journal of Hydrogen Energy, Elsevier Sci8ence Publishers B.V., Barking, GB, vol. 22, No. 8, Aug. 1, 1997, pp. 791-798, XP004075354, ISSN: 0360-3199, DOI: DOI:10.1016/S0360-3199(96)00210-8, p. 791-pp. 793; Tables 1, 2.
IPR No. 2016-01079, filed May 20, 2016.
USPTO Case IPR No. 2015-01071, Patent Trial and Appeal Board Final Written Decision, U.S. Pat. No. 7,078,011 B2.
USPTO Case IPR No. 2015-01072, Patent Trial and Appeal Board Final Written Decision, U.S. Pat. No. 7,078,011 B2.
USPTO Case IPR No. 2015-01073, Patent Trial and Appeal Board Final Written Decision, U.S. Pat. No. 7,078,011 B2.
Ahmet Ozarslan: Large-Scale Hydrogen Energy Storage in Salt Caverns; International Journal of Hydrogen Energy., vol. 37, No. 19, Oct. 1, 2012, pp. 14265-14277, XP055345828, GB ISSN: 0360-3199, DOI: 10.1016/j.ijhydene.2012.07.111.
Ph. Boucly et al. Edited by Magnus Bergman: Subsurface Space Environment Protection Low Cost Storage Energy Savings; Proceedings of the International Symposium (Rockstore '80), Stockholm, Sweden, Jun. 23-27, 1980, vol. 1; Pergamon Press, pp. 251-257.
Heike Bernhardt et al.: New Developments in the Gas First Fill Process of Natural Gas Storage Caverns; Solution Mining Research Institute, Clarks Summit, PA; www.solutionmining.org; SMRI Fall 2011 Technical Conference; Oct. 3-4, 2011, York, United Kingdom; pp. 1-13, XP055372266.
Wolfgang Schreiner et al.: IfG Cavern Design Concept Rockmechanical aspects for the development and operation of rock salt caverns; Solution Mining Research Institute, Clarks Summit, PA; www.solutionmining.org; SMRI Fall 2010 Technical Conference; Oct. 3-6, 2010, Leipzig, Germany, pp. 1-15, XP055371971.
Fritz Crotogino et al.: Energy Storage in Salt Caverns/Developments and Concrete Projects for Adiabatic Compressed Air and for Hydrogen Storage; Solution Mining Research Institute, Clarks Summit, PA; XP055372254, Retrieved from the Internet <URL:http://www.solutionmining.org; SMRI Spring 2008 Technical Conference; Apr. 28-29, 2008, Porto, Portugal, pp. 1-12.
Peter Fritze et al.: Start-Up and Commissioning of an Underground Gas Storage Facility with Special Respect of the First Gas Filling of the Storage Caverns; Solution Mining Research Institute, Clarks (56) References Cited

OTHER PUBLICATIONS

Summit, PA; www.solutionmining.org; SMRI Spring 2002 Meeting; Apr. 28-May 1, 2002, Banff, Alberta, Canada, pp. 1-13, XP055372264.
Thomas Luschtinetz et al.: 14. Symposium—Nutzung Regenerativer Energiequellen Und Wasserstoff-Technik 2007; Energie-Symposium; Nov. 8-10, 2007; Fachhochschule Stralsund; University of Applied Sciences; ISBN 3-9809953-6-4; Article from same symposium by F. Crotogino et al.—Wasserstoff-Speicherung in Salzkavernen zur Glattung des Windstromangebots; KBB Underground Technologies GmbH, Monkhofer Weg, Lubeck, pp. 12-18, XP055371974, ISBN: 3-9809953-6-4.
Paul E. Nelson et al.: State-of-the-Art Review and New Techniques for Mechanical Integrity Tests of (Gas-Filled) Natural Gas Storage Caverns; Solution Mining Research Institute, Encinitas, California; www.solutionmining.org; SMRI Jun. 2003; RESPEC, Rapid City, South Dakota; Research Project Report 2003-2, pp. 1-92, XP055372295.
Tommy L. Smith et al.: Methods for a Parametric Study of a Proposed Gas Storage Cavern Development in Salt; Solution Mining Research Institute, Clarks Summit, PA; www.solutionmining. org; SMRI Fall 2007 Technical Conference; Oct. 8-9, 2007, Halifax, Nova Scotia, Canada, pp. 1-32, XP055372301.
Tatchell, J. A. et al.: "Journees Internationales D'Etude Sur L'Hydrogene Et Ses Perspectives", Nov. 1976, article "Hydrogen in the Chemical Industry", pp. 1-17, XP055371965.
Svein B. Thaule et al.: Experience with Thermophysical Modelling of Gas Cavern Operations in Etzel; Solution Mining Research Institute, Deerfield, IL; bdiamond@mcs.com; SMRI Fall Meeting 1994; Hannover, Germany, pp. 1-13, XP055372299.
K.D. Williamson, Jr. et al.: Recent Developments in Hydrogen Technology; Los Alamos National Laboratory; Los Alamos, New Mexico; vol. II; TP359.HER43 1986 665.8'1; Library of Congress Card No. 84-29360; ISBN 0-8493-5126-X(v.1); ISBN 0-8493-5127-8 (v.2); Nov. 7, 1984; pp. 1-8, XP055372243.
J.D. Pottier et al; Mass Storage of Hydrogen now edited by Yuda Yurum; and retitled Hydrogen Energy System Production and Utilization of Hydrogen and Future Aspects; Kluwer Academic Publishers; with NATO Scientific Affairs Division; Department of Chemistry; Hacettepe University; Ankara, Turkey; NATO ASI Series; Series E: Applied Sciences—vol. 295; ISBN 0-7923-3601-1; Aug. 21-Sep. 3, 1994.
Underground Storage; British Geological Survey; 2008, pp. 22, XP055372252, retrieved from the internet <URL: https://www.bgs.ac.uk/downloads/start.cfm?id_1370>.
Solution Mining Research Institute; SMRI DMLCO website content Feb. 11, 2010, Section 6, Research Archive DMLCO, XP055372261; <URL:http://www.solutionmining.org>.
Tatchell, J. A.: "Hydrogen in the Chemical Industry.", AIM Conference Proceedings L'Hydrogene Et Ses Perspectives., Nov. 15, 1976 (Nov. 15, 1976), Liege, Belgium, XP055371965.
Hardy et al.: "The Mechanical Behavior of Salt", Proceedings of the First Conference, Series of Rock and Soil Mechanics, vol. 9, 1981, pp. 1-21, XP055372269, ISBN: 0-87849-145-0.
Opposition I by Storengy, P.O. Box CS 70001, Batiment Djinn, 12 Rue Raoul Nordling, 92270 Bois-Colombes, France—filed Apr. 5, 2017—in EP 2855306.
Opposition II by EnergyStock B.V., P.O. Box 364, 9700 Aj Groningen, Netherlands; filed Apr. 6, 2017 in EP 2855306.
Opposition III by L'Air Liquide, Societe Anonyme pour l'Etude et l'Exploitation des Procedes George Claude, 75, quai d'Orsay 75007 Paris, France; filed on Apr. 7, 2017 in EP 2855306.
Opposition IV by Innogy Gas Storage NWE GmbH, Flamingoweg 1, 44139 Dortmund, Deutschland; filed Apr. 10, 2017 in EP2855306.

\* cited by examiner

METHOD OF SUPPLYING HYDROGEN THROUGH AN INTEGRATED SUPPLY SYSTEM

FIELD OF THE INVENTION

The present invention relates generally to a method for supplying hydrogen through a hydrogen supply system in fluid flow communication with one or more storage caverns, multiple hydrogen production sources, and a pipeline distribution system capable of compressing and delivering hydrogen to a plurality of hydrogen demand points while meeting demand point delivery pressure requirements. The method provides operational flexibility to optimize the performance of the production sources by minimizing feedstock costs while effectively meeting the demand requirements of the customers. Lastly, the method provides several unique business processes utilized to maximize profitability of a hydrogen supply system with one or more integrated subterranean hydrogen storage caverns.

BACKGROUND OF THE INVENTION

The worldwide demand for hydrogen has been increasing at rapid rates and its scope of industrial uses continues to expand. To meet such demand, hydrogen delivery systems have been developed which integrate multiple hydrogen production sources, typically large hydrogen plants, by connecting to a pipeline distribution system which transfers the hydrogen gas from points of production to points of use, typically after product compression to meet delivery pressure constraints. These pipeline and storage delivery systems are large, complex and designed to meet the varied requirements of multiple use points which include customers such as refineries, chemical plants, fertilizer plants, and other industrial users.

Automated control systems have been used to control the operation of hydrogen plants at both the individual plant level and the system level to address the various needs of the use points and maintain efficient plant operation. The variables addressed include demand swings; production requirements including feed and power costs; and operational requirements such as flow, pressure, emissions control, down time, and transportation constraints. Typically, individual hydrogen plants are optimized to meet variable demand by turning down the plants at low demand requirements to reduce production costs and turning them up at peak demands requirements. Such swings in production add excessive wear to the plants and can limit the extent of optimization that can be achieved. When multiple hydrogen plants are linked to an integrated gas delivery system that includes an underground hydrogen storage complex, the operational pressure of the pipeline can be controlled to minimize the impact on individual plants. It is also noted that real optimization can be achieved by looking at the entire system and understanding the relative shadow prices associated with each constraint imposed on the system.

Underground caverns or related storage sites have been used in the past for collecting inventories of gases, most commonly natural gas. For example, natural gas has been stored in various geological formations such as depleted reservoirs in oil and/or gas fields, aquifers, and salt cavern formations. More recently, hydrogen has been held in underground salt caverns and proposed for storage in these other geological formations.

High purity hydrogen (e.g. above 96% and preferably above 99%) storage within solution mined salt caverns presents several challenges. For example, storing large quantities (e.g., greater than 100 million standard cubic feet) of high purity gaseous hydrogen in underground caverns consisting of a minimum salt purity of 75% halite (NaCl) or greater without measurable losses is difficult based on the properties of hydrogen. Hydrogen is the smallest and lightest element within the periodic table of elements, having an atomic radius measuring 25 pm+/−5 pm.

Further, hydrogen is flammable, and therefore a very dangerous chemical if not handled properly. Salt caverns consist of salt that have various ranges of permeability (e.g., $0\text{-}23\times10^{-6}$ Darcy) that if not controlled properly could easily allow gaseous hydrogen to permeate through the salt and escape to the surface of the formation. If the stored hydrogen within an underground salt formation was to escape and permeate through the salt formation to the surface, a dangerous situation could arise. Consequently, high purity hydrogen is typically considered one of the most difficult elements to contain within underground formations and there are currently very few hydrogen storage caverns in commercial use containing high purity hydrogen.

Hydrogen storage caverns have recently been integrated into pipeline distribution systems which include integration to hydrogen production sources. For example, see U.S. Pat. Nos. 7,078,011 B2, 8,690,476 B2 and 8,065,243 B2 which show or discuss hydrogen storage caverns integrated into pipeline systems. But the operation of the hydrogen production sources as disclosed therein were not integrated into the operation of the cavern. Secondly, the optimization approach did not address the extensive method of optimizing a contribution (or profit) margin in real-time subject to imposed system constraints. It has now been found that an integrated hydrogen system can be operated in a manner that optimizes the operation of each of the hydrogen sources, both individually and collectively, through the integrated use of the cavern. In addition, it has also been found that the operation of an underground high purity hydrogen storage cavern can be safeguarded against unexpected rises in pressure due to geologically induced creep closure, by relieving excess pressure formation by instantaneously withdrawing the stored hydrogen into a pipeline distribution system and decreasing the quantity of hydrogen being produced from the various hydrogen production sources co-located on the hydrogen pipeline system.

The present invention greatly increases the flexibility of the integrated supply operation and maximizes the profitability of the system while ensuring the efficient operation of the plants in a way not available without the use of the one or more underground hydrogen storage caverns. This coordinated operation of the entire integrated hydrogen supply system, including multiple hydrogen sources and one or more caverns, permits the operation of the individual hydrogen plants to be optimized to minimize the variable costs while continuing to meet the variable demand and pressure requirements of the multiple use points. Lastly, the coordinated operation of the integrated hydrogen storage and production sources in connection with the pipeline distribution system permits the enhanced operation of an underground hydrogen storage cavern and enables further optimization of hedging various hydrogen related feed stocks.

BRIEF SUMMARY OF THE INVENTION

The present invention provides a method for supplying high purity hydrogen through a hydrogen supply system comprising in fluid flow communication one or more storage caverns, multiple hydrogen production sources, and a pipeline distribution system capable of delivering hydrogen to a plurality of hydrogen demand points to meet a dynamic demand profile while optimizing the operational and economic performance of the entire hydrogen system.

According to this invention, a method of supplying high purity hydrogen through an integrated hydrogen system comprising in fluid flow communication with one or more hydrogen storage caverns, multiple production sources, and a hydrogen pipeline distribution system capable of providing the hydrogen to a plurality of hydrogen demand points is provided. The method comprises the steps of:

obtaining real time input data regarding at least i) the operating conditions of the one or more hydrogen storage caverns including the current amount of hydrogen stored in the one or more hydrogen storage caverns, the pressure of hydrogen being stored in the one or more hydrogen storage caverns, the economic value of the stored hydrogen inventory and the available storage capacity, ii) the operating conditions for each of the multiple hydrogen production sources including the actual plant hydrogen production rate of each hydrogen plant as measured in units standard cubic feet (scf), iii.) the design efficiency of each hydrogen production source as measured by the required amount of BTUs of natural gas to produce a scf of hydrogen gas, and iv) the demand requirements of the plurality of hydrogen demand points;

comparing the input data to the optimal storage capacity and available hydrogen of the one or more hydrogen storage caverns in real time, and adjusting at predetermined time intervals the operation of the integrated hydrogen system during demand periods such that (a) during the period that the hydrogen demand requirements are below the optimal hydrogen production rate of the multiple hydrogen production sources, the excess hydrogen is compressed and injected into and stored within the hydrogen storage cavern and (b) during the period that the hydrogen demand requirements are above the optimal hydrogen production rate of the multiple hydrogen production sources, hydrogen is withdrawn from the hydrogen storage cavern and introduced into the hydrogen pipeline distribution system, and maintaining the optimal hydrogen production rate for each of the multiple hydrogen production sources during operation such that each hydrogen production source operates substantially along an optimum efficiency curve during the demand periods of (a) and (b) above.

The system may take advantage of the pipeline pack during a transient period when there is an imbalance between total production and total demand. The amount of excess pack is a business input or constraint that ensures system flexibility.

Furthermore it should be noted that the process listed above can be done manually or with the help of an advanced control system.

An advanced control system on such a process would, on a pre-determined schedule, automatically read in the current process conditions from the Supervisory Control And Data Acquisition (SCADA) system or Distributed Control System (DCS), perform some validity checks, and perform some kind of optimization that would generate new set points for the individual plants to minimize an economic objective function, such as feedstock or power costs. The newly generated set points would be validated against the primary control system limits, and would be implemented such that the process would move towards the optimal targets, while maintaining the various safety, operational and process constraints. The objective function can also be a profit function (revenue−cost) to be maximized subject to the same constraints.

BRIEF DESCRIPTION OF THE DRAWINGS

For a further understanding of this invention, reference should be made to the Detailed Description of the Invention below taken in conjunction with the accompanying drawings which are used to represent illustrative embodiments of this invention and wherein.

DETAILED DESCRIPTION OF THE INVENTION

Figure 1:
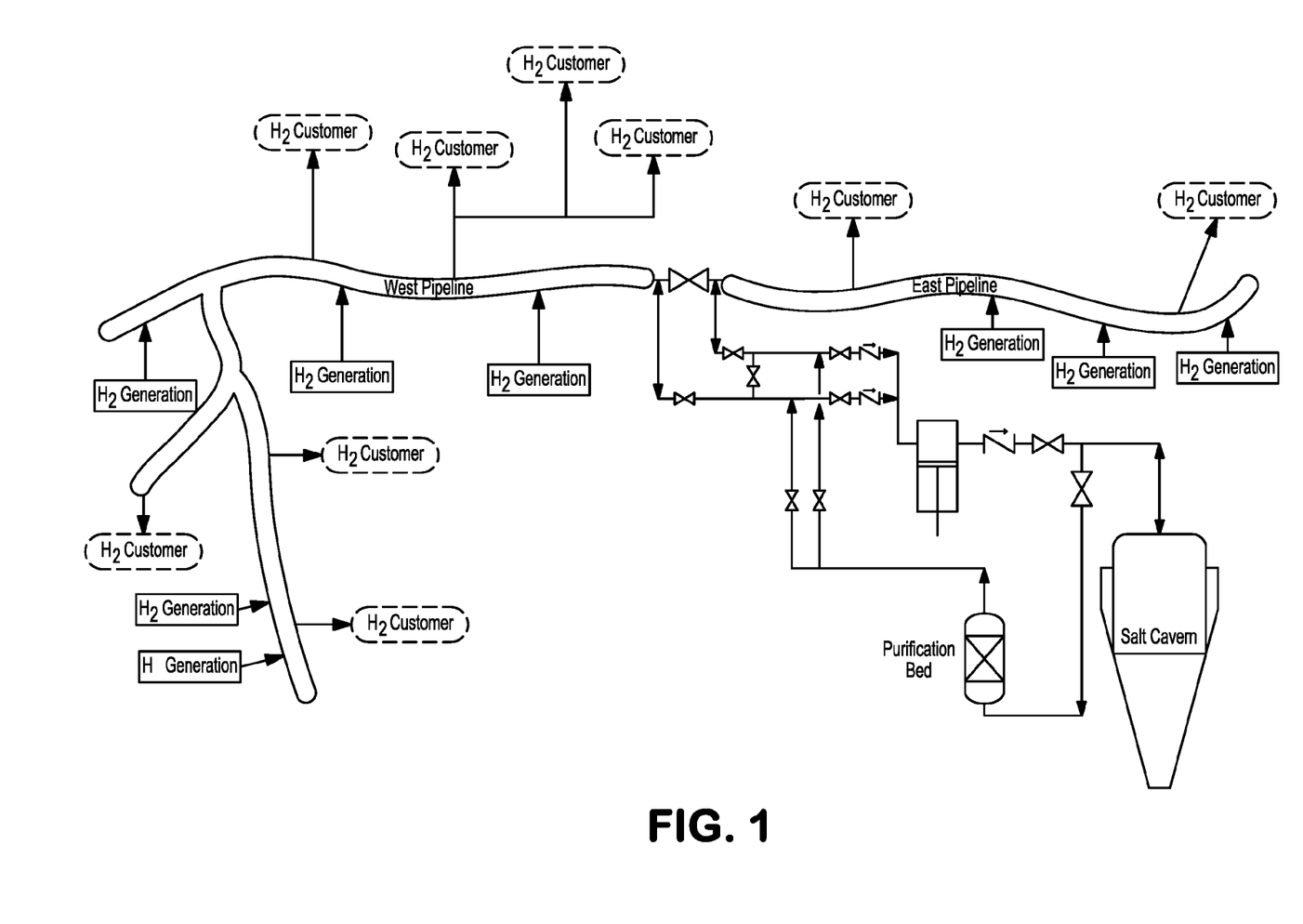
FIG. 1 shows a schematic of an integrated hydrogen supply system.

The present invention is directed to a method for optimization of the operation of a hydrogen supply system comprising in fluid flow connection one or more storage caverns, multiple production sources, and a pipeline distribution system capable of delivering hydrogen to a plurality of hydrogen demand points. These demand points or use points are typically customer industrial facilities that require real time usage of hydrogen ranging from several thousand standard cubic feet to several million standard cubic feet. FIG. 1 is a schematic showing an integrated hydrogen supply system comprising a single storage cavern in communication with a multiple hydrogen production sources and a pipeline distribution system. The pipeline is also connected to multiple end use sites identified as H2 consumers.

The storage cavern can be an underground salt cavern, aquifer, and depleted oil or gas field capable of holding large volumes of high purity hydrogen under conditions which permit the controlled ingress or egress of high purity hydrogen into a pipeline system. Preferred are salt caverns such as disclosed in U.S. Pat. Nos. 7,078,011 B2; 8,425,149 B2; and 8,690,476 B2 and Patent Application Publication U.S. 2013\0213479 A1 which are incorporated herein by reference. High purity hydrogen as used herein is hydrogen gas at greater than 96% purity, preferably greater than 99% purity, and more preferably at greatly than 99.9% purity.

The high purity hydrogen is generally held in the cavern under pressure using a control system capable of introducing hydrogen from, and removing hydrogen to a pipeline system which is in continuous fluid connection with a plurality of hydrogen use points such as refineries, chemical plants and other industrial or energy production applications. The term "fluid" as used herein is intended to cover a gas phase, liquid phase or a combination thereof. These caverns are operated to store the high purity hydrogen in a gaseous state for rapid use with minimal processing. Moreover, this invention includes the use of multiple caverns connected to the hydrogen pipeline system. As explained, the cavern(s) are operated to receive, hold and release high purity hydrogen into the pipeline system to address the variable demand needs of the customers, also described herein as use points.

The production sources are hydrogen production plants which generally make hydrogen from natural gas. In addition, some of the hydrogen production plants purify various hydrogen rich off-gas streams from chlor-alkali hydrogen based sources, dehydrogenated hydrocarbon sources and ethylene steam cracker hydrogen off gas sources. Multiple production sources are intended to mean two or more sources, preferably more than three. Typically, hydrogen is manufactured by steam methane reforming (SMR) in which natural gas and steam are reacted at high temperature over a catalyst to produce synthesis gas (syngas). Syngas is further processed using the water-gas shift reaction to form more hydrogen. Hydrogen is then separated from the reaction products usually in pressure swing adsorption (PSA) purification beds and high purity hydrogen is then introduced into the pipeline for distribution to the customers. Alternatively, hydrogen can be produced from partial oxidation of hydrocarbons (POX), recovered from a hydrogen rich (off-gas) streams or from other pipeline systems. Such hydrogen sources are well known and are in commercial use today. However, any technology for making high purity hydrogen can be employed as the particular hydrogen production source. The hydrogen production sources are also referred to herein as "plants" which is used to describe the entire hydrogen production scheme; from feed to final hydrogen production. The type of plant dictates which type of constraint could be imposed on the system. As an example, a steam host for an SMR plant may demand higher (premium) steam which may invariably require increased quantities of hydrogen being produced from that particular facility and a corresponding decrease in other facilities if there is no incentive to store additional hydrogen in the cavern.

When the demand for the hydrogen is low or, for any reason, production exceeds demand, hydrogen can be introduced into the cavern for storage without effecting the operations of the hydrogen production plants in a negative manner. Conversely, there are instances when a hydrogen production plant is taken off-line or when demand for hydrogen exceeds the available production capabilities of the online hydrogen plants, either of which necessitates removal of the stored hydrogen from the cavern, preferably with minimal purification or other processing, and introduction into the pipeline system for distribution. Moreover, the use points can typically draw hydrogen at real time demand rates, which can ramp up or down quickly and, in some circumstances, totally cease demand when the use is not required, such as when the refinery or chemical plant is down. This variable hydrogen demand can also take the form of variable pressure or flow requirements and places unpredictable and inconsistent demand requirements on the production sources which must have the capability to meet both the demand and any contractual obligations regarding supply. Finally, there are times when customer demand just exceeds the hydrogen production capacity of all existing production sources and with an integrated cavern system, the stored hydrogen can be used to supplement the hydrogen pipeline system such that even the incremental customer demand can be met. Without the integrated cavern system, the incremental needs of the customer could not be met.

Historically, hydrogen supply systems not having cavern availability are operated such that one or more of the plants would be turned up to, or near, full capacity to meet the hydrogen requirements of the use points at times of high demand. At regular intervals, the sudden and rapid increases in demand can exceed the hydrogen plants ramp up rate capabilities (the ability to raise or turn up production levels) which can lead to inefficient plant operating conditions and potential safety concerns such as and known within the SMR operating community as "over firing". Typically, world scale SMR based hydrogen plants can only ramp up safely and efficiently to about 10% of their original design capacity in in a given time interval. At times of low demand, one or more plants would be turned down to reduce the use of the costly feed gas and/or other energy demands also leading to inefficient plant operating conditions. This variable demand results in a dynamic demand profile and places a wide degree of unpredictability on the operation of the production plants and the entire system.

Further, the increase in demand or reduction in demand occurs in real time and typically varies in very short time intervals. The cycle of turn up and turn down is repeated frequently within short time spans such as within hours or even minutes. Both the frequency of the cycles and the quick movement from one production rate to another rate places excessive wear on the plant components, which can lead to flaring of unneeded hydrogen and/or cause the operation of the plants under conditions that are outside the range of their peak operating efficiency as measured by the amount of energy consumed divided by the quantity of hydrogen produced. Alternatively, while this dynamic demand profile can be addressed, to some limited extent, by having multiple plants connected to the pipeline system, these plants continue to operate at suboptimal operating conditions for significant amounts of time.

In addition, hydrogen is generally supplied to the customers or use points on the pipeline distribution system under supply agreements that require continuous hydrogen availability regardless of the demand profile requirements or the need to maintain plants. Also, it should be noted that SMR produced hydrogen utilizes natural gas, which is also sourced and/or procured under long term contracts that require continuous usage of the methane based feedstock regardless of the demand profile of the hydrogen consuming customers. Having reduced hydrogen demand by customers coupled with natural gas supply agreements that necessitate procuring the natural gas regardless of hydrogen customer demand can be effectively managed with the use of hydrogen storage. The use of an automated control system coupled with an economic optimizer requires that the objective function must incorporate the daily natural gas imbalance cost, if any, in the objective function. This comprises the difference between nominated natural gas (NG) quantities versus actual NG usage as well as the difference in the NG daily price versus the NG first of month (FOM) price.

Hydrogen off gas sources, which are then purified and introduced into the hydrogen system, are done so under supply agreements as well. When any of the production sources are taken off-line for planned or unplanned maintenance, this results in limited supply of hydrogen and potentially impacting purchased hydrogen supply agreements and natural gas based feed stock agreements thus invoking a potential violation of such agreements or the levy of penalty payments. Again, the integrated hydrogen storage system can be utilized efficiently to eliminate such penalties.

In fact, the use of hydrogen storage can allow a hydrogen producer to arbitrage both natural gas and the direct purchase of hydrogen through third party hydrogen feed stock agreements. An integrated hydrogen storage system allows the operator to produce hydrogen when natural gas or when third party hydrogen feed stocks are below the average market price, then store the hydrogen within the storage facility and then when prices are above market price, withdraw the hydrogen from the storage cavern and sell into the market, hence realizing incremental arbitrage profits. Simultaneous contracts can be signed using NG forward prices for two future dates, consistent with the scenarios described above, to lock in risk-free profits regardless of what the actual NG prices turn out to be in the future. Thus, the dynamic demand profile requires a flexible supply system capable of meeting the real time, dynamic demand without incurring penalties in operating efficiencies or contractual requirements. A storage cavern connected to the hydrogen pipeline system provides a means of storing and supplying hydrogen to the pipeline. It is important that the hydrogen in the cavern be maintained in a condition to provide high purity hydrogen that substantially meets product purity specifications. It is preferred that the hydrogen be maintained under conditions that require minimal purification or processing from contaminants including hydrocarbons, carbon oxides, and moisture. In the most preferred embodiment, the hydrogen is placed directly into the pipeline system in the absence of further purification. The preferred embodiment allows instantaneous delivery of high purity hydrogen to the pipeline to meet real time demand requirements.

The cavern provides an added parameter to be used when managing the hydrogen production and managing existing natural gas feedstock and hydrogen purchase agreements to meet demand requirements and decouples the direct relationship between hydrogen production and immediate or real time demand requirements. This enables supply system operators to maximize plant efficiency and profitability at any given hydrogen production rate within production equipment design limits as well as other production parameters in response to the dynamic demand. For example, during periods when natural gas is inexpensive or inexpensive fuel sources (tail gas or refinery off-gas) are plentiful, operators may choose to increase production rates for those hydrogen sources having access to the lower cost fuel. The excess hydrogen can then be stored in the cavern for later use and/or sold at peak demand or maximum economic value.

The cavern allows instantaneous injection and withdrawal of hydrogen, acting as both a consumer of excess hydrogen and also as a source for increased production. The injection and withdrawal is directly correlated to input data received from the dynamic demand in the pipeline system and is coordinated with the production sources. The hydrogen stored within the cavern, often referred to as "working gas", is used to supplement the production of hydrogen by injecting it into the pipeline system during times of unscheduled demand increases rather than forcing the rapid increase in production rates at one or all of the hydrogen production plants. On the other hand, when the aggregate hydrogen system production exceeds the aggregate system hydrogen demand, the hydrogen sources can be continuously operated at or near peak operating conditions with the excess hydrogen being injected into the cavern and stored for use at a future time. The plants can then be turned down in a controlled fashion while maintaining operation along their optimum efficiency curve. The, real time, dynamic hydrogen demand is addressed through the rapid and coordinated modifications in the operation parameters of the multiple production sources and the cavern.

Additionally, the coordinated ability to inject excess hydrogen capacity into the cavern and to withdraw high purity hydrogen to supplement pipeline flows to meet demand and/or contract hydrogen supply obligations enables unprecedented operational flexibility in operation of the hydrogen system. In a more manual operation, operators are able to select the most advantageous set of process conditions to run the plants, thereby maximizing profits for vastly longer periods of time. Business managers are also, for the first time, able to take into account operating variables such as natural gas prices, environmental emissions constraints, power costs and labor indices in addition to demand swings; production requirements; and operational requirements; and transportation variables when deciding whether to ramp specific production plants up or down in order to maximize efficiency, supply and profits. This presents an economic advantage and financial benefits outside current operational constraints.

The integrated supply system also provides for the ability to relieve and safeguard the hydrogen storage cavern(s) from unexpected internal pressure rises caused by geologically induced creep closure effects. Underground storage cavities suffer from creep closure, which can be described simply as the rock strata located above the cavern, exerting pressure on the salt cavern cavity forcing it to close and, hence, reduce the amount of stored contents. The pressure that is exerted on the cavern walls and the cavity itself can cause the cavern to lose physical volume, hence this phenomenon is known as creep closure. In a different, but related embodiment, gauges are placed downhole to monitor the pressure at the casing shoe within salt caverns (not shown). Should the internal pressure of the cavern rise due to geologically induced stress, the stored hydrogen can then be supplied to the pipeline to alleviate the detrimental and unwanted condition of over-pressurization of the cavern, while allowing the plants to operate under conditions within the range of their peak operating efficiency.

Figure 2A:
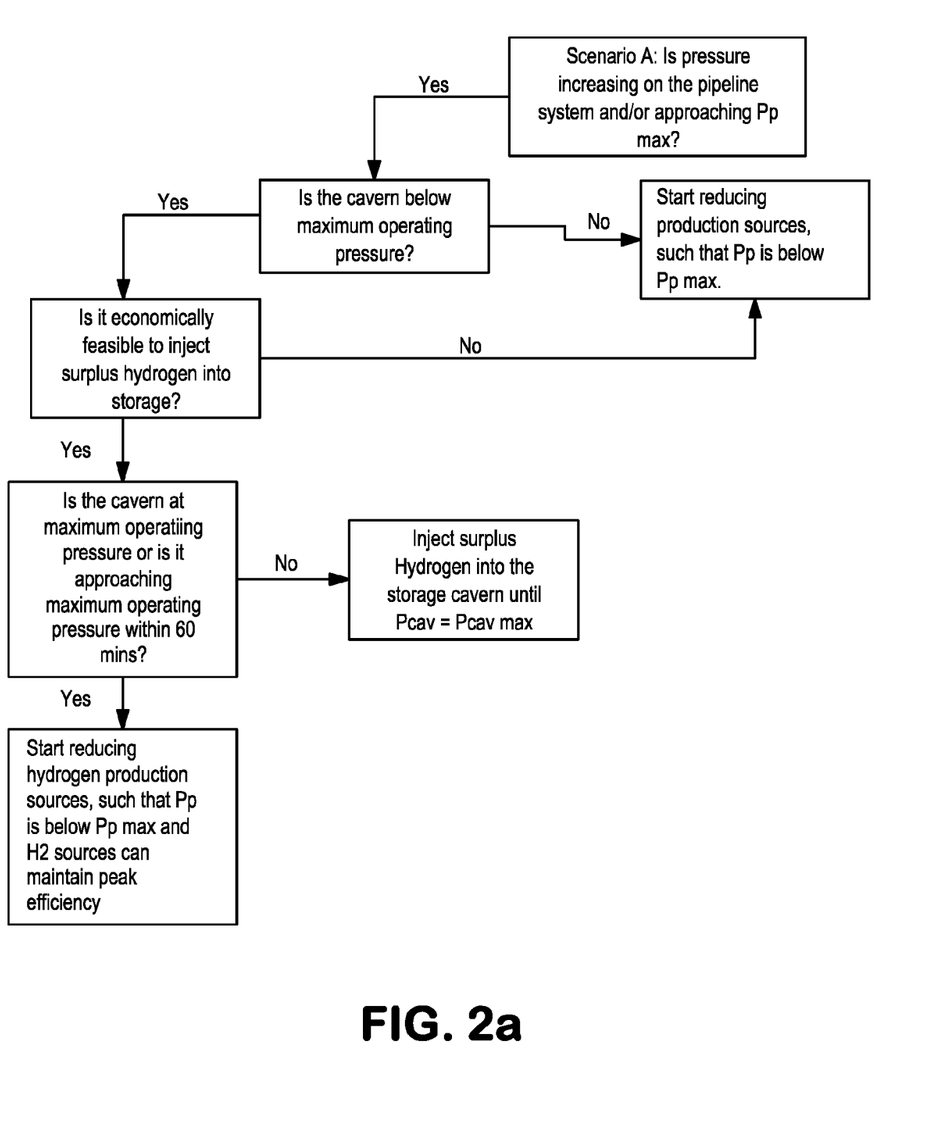
FIGS. 2a and 2b are flow diagrams illustrating methods for operating a hydrogen cavern injection and withdrawal process.
Figure 2B:
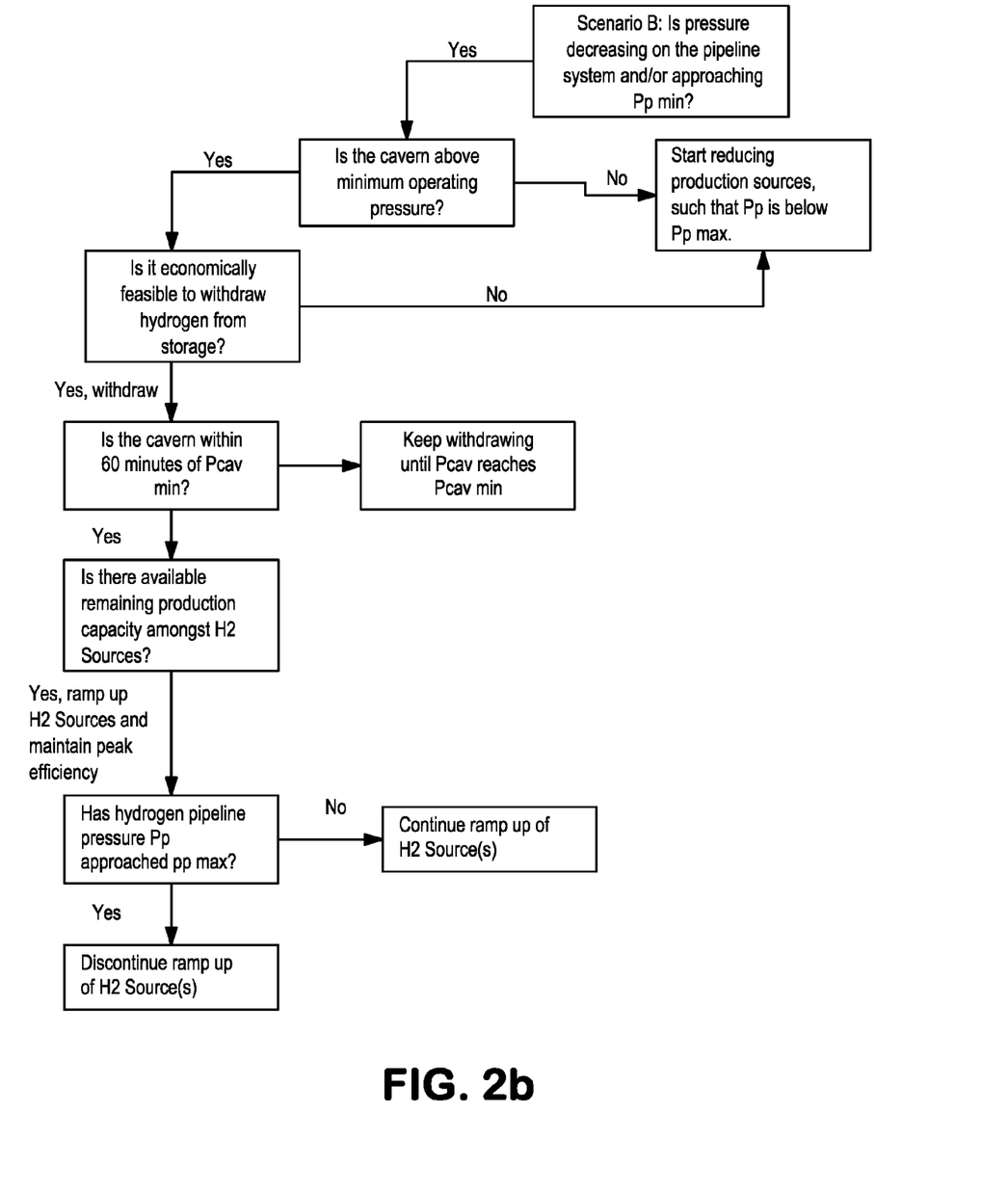

FIGS. 2a and 2b are flowcharts for methods of operating the integrated system showing decision trees for injection and withdrawal of hydrogen into the storage cavern during high and low demand. These flow charts illustrate the operational flexibility of a multiple hydrogen plants in fluid communication with the complex pipeline distribution system. The input data used in this embodiment to measure the demand on the pipeline system is the pressure in the pipeline system and the pressure in the storage cavern. The pressure is monitored at multiple points within the pipeline and cavern by the use of conventional pressure gauges or monitors which can send data to a central control processor for regular readings at predetermined time intervals. Preferably this is done every minute, preferably every 10 seconds or less and more preferable every second or less. A reading indicating pressure is increasing is interpreted as reduced demand in the system while a reading indicating pressure is decreasing indicates increased hydrogen demand. Constant readings in one direction or the other or which more than a predetermined percent variance are from predetermined steady state over a predetermined time interval which indicates that hydrogen must be routed from or to the cavern.

Simultaneously with the pressure readings in the pipeline system, pressure reading in the cavern will indicate the availability of working gas or the capacity of the cavern. Depending on the need, hydrogen will be injected or withdrawn either to or from the system. A business decision is required to determine the status of the cavern: inject, withdraw or remain inactive. Once the input is made available to the system optimizer as well as the dynamic pressure controller, the system will automatically control the system pressure with the available "handles" the actuation of valves and compression equipment.

Contemporaneously, each hydrogen production plant will run at rates that will optimize the overall performance of the plant to minimize the cost in the production of hydrogen and to obtain maximum output of hydrogen. As used herein, the optimum efficiency curve is defined as the minimum amount of energy needed to produce the desired quantity of hydrogen at all times. Should there be a business need to inject excess $H_2$ production, the desired injection rate is entered along with the start up of the compression equipment. The system will then select which plats to ramp up to ensure the overall system is optimized.

Figure 3A:
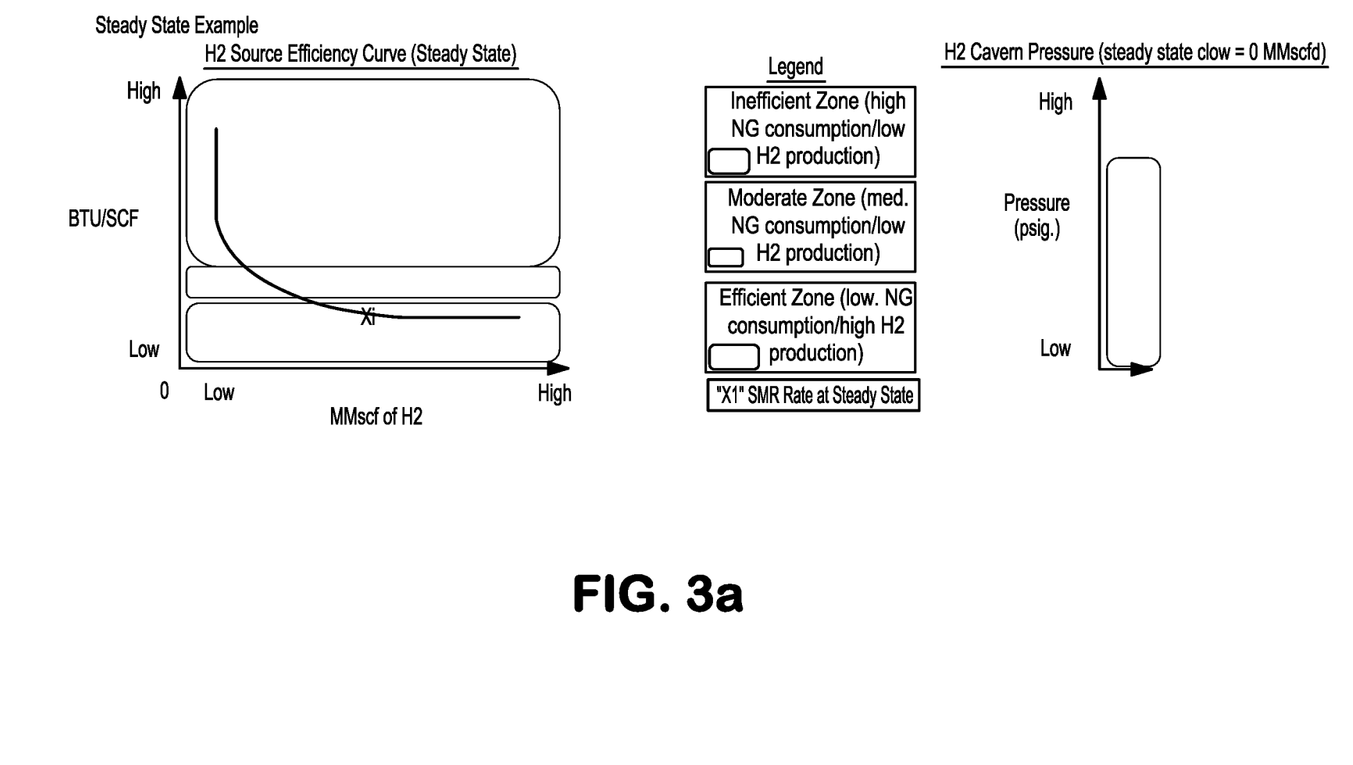
FIG. 3a is a graph showing the peak efficiency curve of a standard hydrogen integrated system operating at steady state conditions with the storage cavern operating at constant pressure.
Figure 3B:
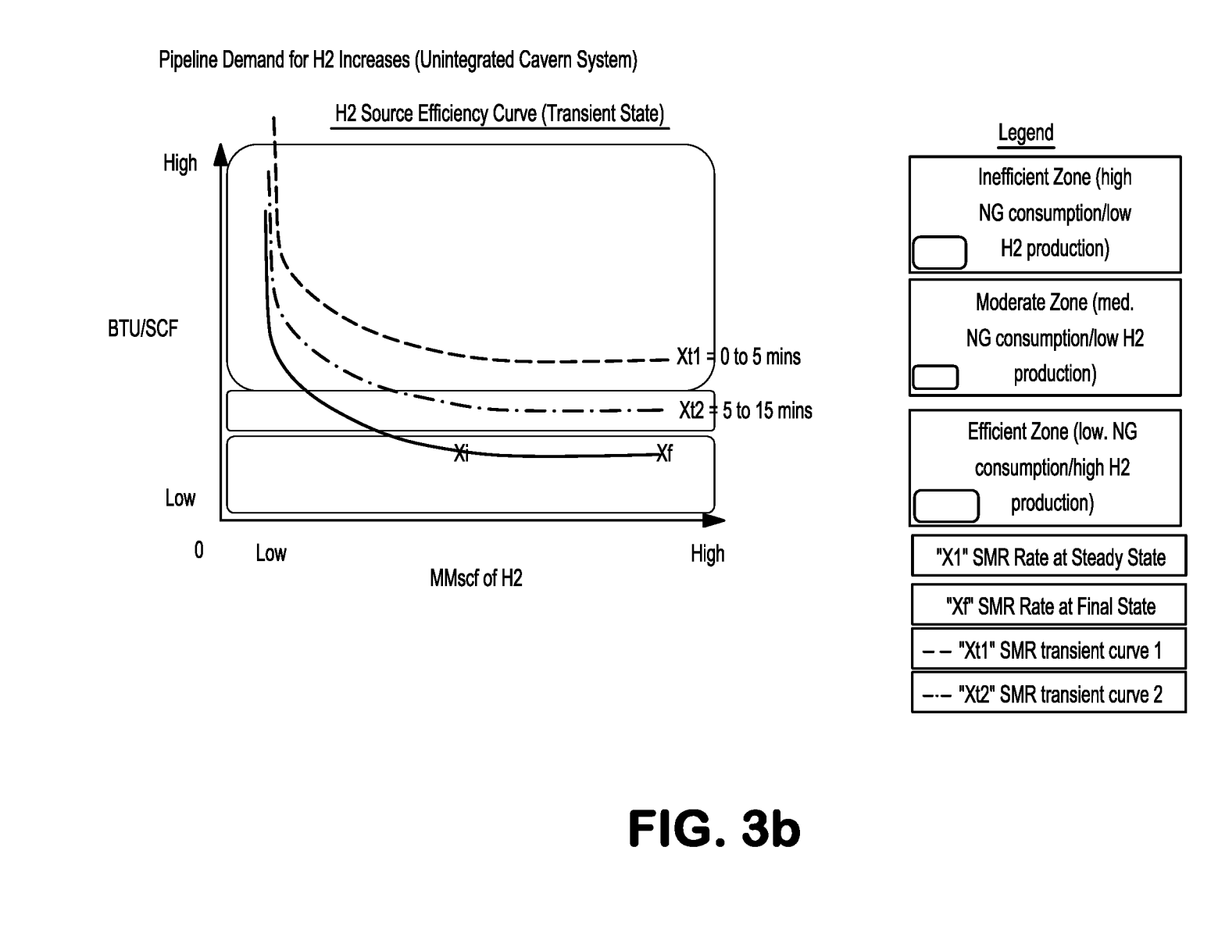
FIG. 3b is a graph showing peak and non-peak efficiency curves of a standard hydrogen system operating without a storage cavern.
Figure 3C:
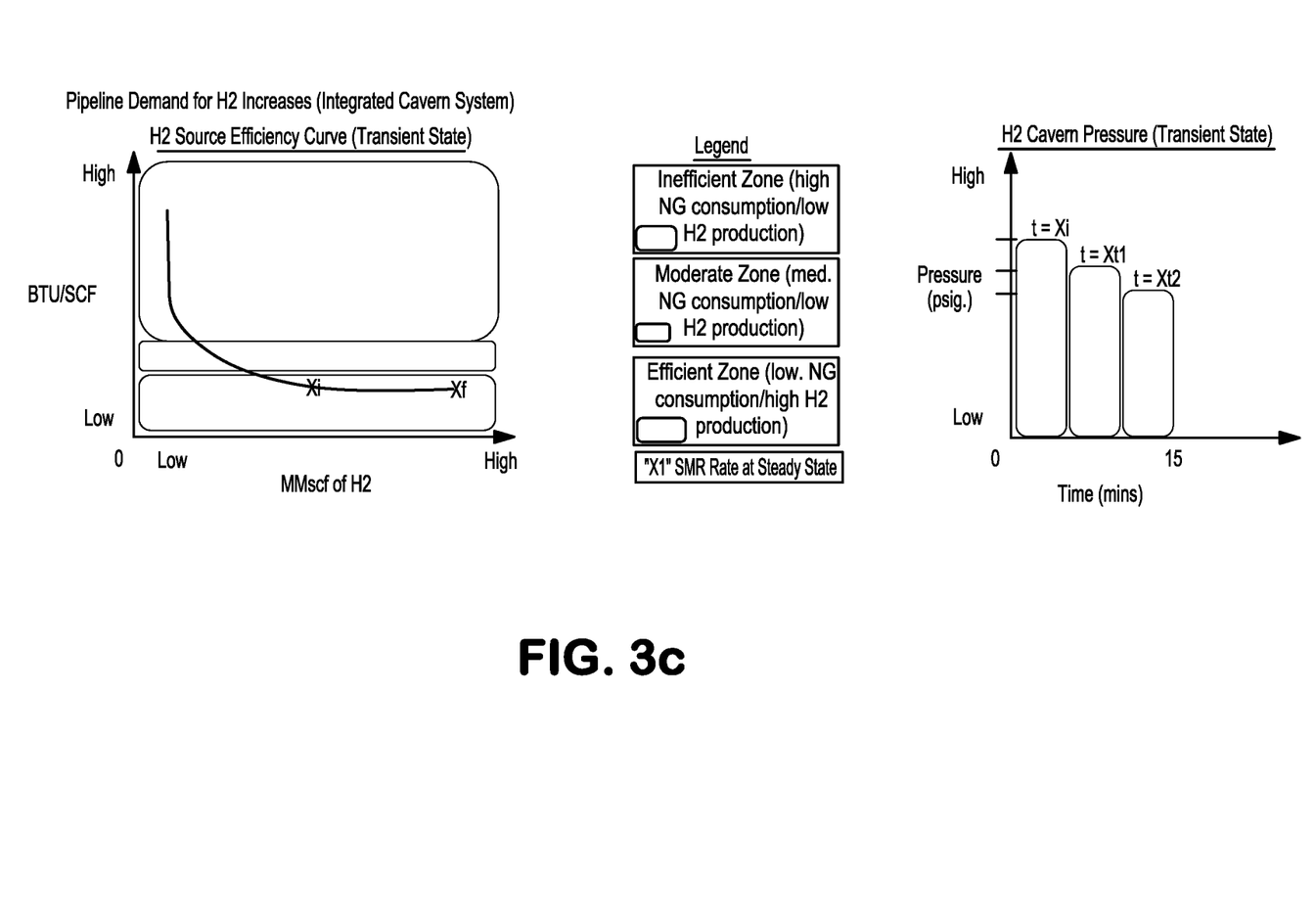
FIG. 3c is a graph showing the peak efficiency curve of an integrated hydrogen supply system with a storage cavern operating in non-steady state conditions.

FIGS. 3a, 3b and 3c are graphs which plot British Thermal Units (BTUs) of natural gas per standard cubic foot (scf) of hydrogen produced. The hydrogen is high purity hydrogen as defined herein. The graphs show efficiency curves for the production of high purity hydrogen from natural gas in a typical hydrogen production plant. For a current world scale plant based on SMR technology and used herein as a baseline, the minimum amount of natural gas needed to produce the maximum amount of hydrogen is typically about 370 British thermal units per standard cubic feet of hydrogen produced. The efficiency cures are based upon 370 BTUs per mmscf of hydrogen produced. Under these conditions, the graphs illustrate three efficiency zones (i.e. the Inefficient Zone, the Moderate Zone and the Efficient Zone). The Inefficient Zone is defined as anything greater than +10% to produce one standard cubic foot of produced hydrogen. The Moderate Zone is defined as hydrogen production that consumes anywhere between 380 and 410 British thermal units per standard cubic foot of produced hydrogen. The Efficient Zone is defined as hydrogen production that consumes less than a predetermined number (±3%) of British thermal units per standard cubic foot of produced hydrogen. All of the curves and efficiency zones described herein are calculated without consideration of the energy associated with steam production. The above mentioned efficiency zones and targets are hence, what is known in industry, as the steam adjusted efficiencies.

To further describe the operation of the integrated hydrogen supply system of this invention, the following comparison is made comparing the operation of a hydrogen plant under three scenarios. The first example is the operation of the integrated hydrogen system with a cavern operating at a steady state; the second is a conventional hydrogen pipeline system operation without a cavern; and the third is the integrated supply system of this invention with both the hydrogen plant and the hydrogen storage cavern operating in conjunction under variable demand conditions. For simplification, each of these examples is described for a single hydrogen source on the pipeline and, optionally the hydrogen cavern system. However, it is understood that the claimed supply system includes at least one cavern and multiple hydrogen plants operating in synchronization and all in real time. Further, it is understood that in operation, each plant is connected to the pipeline system which in turn is connected to a plurality of demand points which vary consumption of demand in real time.

FIG. 3a is a graph showing the optimum efficiency curve for optimal operation of a hydrogen plant based on its design specification and the energy value of its fuel source. This plant is operating at steady state condition on an integrated hydrogen supply system having a storage cavern operating at constant pressure. By operating along the optimum efficiency curve shown, the plant produces the maximum amount of high purity hydrogen per BTU of natural gas consumed. As shown, the curve move through the 3 zones as described above.

FIG. 3b is a graph showing its optimum efficiency curve for optimal operation of a conventional hydrogen plant connected to a pipeline system operating without a storage cavern. Also shown is the effect of real time demand requiring the operation of the plant off the optimum operating curve. The solid line on the graph shows the optimum efficiency curve for producing the maximum amount of high purity hydrogen per BTU of natural gas. The dotted lines show the non-optimum operating curves of the hydrogen plant when required to address high hydrogen demands in short intervals of time as required in actual use. As the hydrogen plant increases hydrogen production rate to meet real time demand, the production efficiency deteriorates over a defined time interval, such as the fifteen minutes shown, before the plant regains its optimal efficiency along the optimum efficiency curve.

FIG. 3c is a graph showing its optimum efficiency curve for optimal operation of a hydrogen plant connected to a storage cavern. This plant is operating in a non-steady state condition. The storage cavern is operated in conjunction with the plant to accept or provide high purity hydrogen and is also operating at a non-steady state. During rapid changes in hydrogen demand from the various demand points, the hydrogen supply system integrated with the operation of the hydrogen storage cavern is controlled to manage the hydrogen production changes more efficiently and safely. The hydrogen storage cavern supplies high purity hydrogen to the pipeline system over a predetermined time interval, again a fifteen minute interval is used here, while the hydrogen plant simultaneously transitions its hydrogen production rate along its optimal efficiency curve.

FIG. 3c connects graphically the resulting outcomes and benefits of a hydrogen system that is operationally tied to hydrogen storage cavern. In this example, the demand exceeds the pre-existing supply capability of the current on-line hydrogen plant(s) based on their design specifications. At these optimum demand, the hydrogen storage cavern is instructed to provide additional high purity hydrogen to the hydrogen pipeline system at predetermined time intervals based on the demand, such as at a time of intervals of 30 minutes or less, preferably 5 minutes or less, more preferably every minute or less (or when t='s Xi as shown). While hydrogen gas is being continuously withdrawn from the storage cavern, the hydrogen plant is simultaneously transitioning from point Xi (low hydrogen production rate) on the efficiency curve to point Xf (high hydrogen production rate) and staying within the desired Efficient Zone. The hydrogen supply system operating in conjunction with the storage cavern allows for the safe and efficient transition of hydrogen production rates without the consequence of efficiency losses or unsafe operating conditions.

Moreover, the storage cavern does not suffer from thermodynamic ramp rate limitations which exist within the hydrogen production process. The process of withdrawing hydrogen from the hydrogen storage cavern results in a corresponding pressure drop in the cavern. The short term reduction of pressure in the cavern can be returned back to its original state by injecting more hydrogen into the storage cavern during periods of excess supply. The cavern will experience a drop in pressure, with negligible thermodynamic efficiency losses compared to that of a hydrogen plant. In short, the integrated hydrogen system can better respond to sudden and rapid changes in demand than compared to a pipeline system without an integrated storage cavern.

Now referring back to FIG. 3b, the graphical results of a hydrogen pipeline system that is not integrated with a storage cavern is shown. This graph illustrates conditions that also experience a sudden and rapid change in customer demand. The hydrogen plant responds to the increase in customer demand by ramping up the production over the same fifteen minute period. The initial starting point of the hydrogen plant is at Xi and the final ramp point is Xf. During the first 5 minutes of the initial ramping period, the curve Xt1 shows the variation from the optimum efficiency curve for the optimal production of high purity hydrogen. The curve Xt1 shows that the hydrogen plant was required to rapidly increase production rates at a faster rate than its thermodynamic designed capability and, as a result, experiences hydrogen production efficiency losses as measured on a BTU used per hydrogen scf produced basis. During the next 5-15 minutes, the hydrogen plant transitions to the Moderate Zone, as indicated by the curve Xt2. The hydrogen plant in this example eventually transitions to higher hydrogen production rates and, as a result, it is able to regain some of the efficiency lost during the first time interval, shown as 5 minutes, of ramp up. After about fifteen minutes, the hydrogen plant is able to transition to hydrogen production rate Xf, which is within the Efficient Zone shown on the graph. The time period of deviation from optimum efficiency can occur multiple times per hour resulting in limited operation on the optimum efficiency curve and significant penalties in production efficiency.

Moreover, it should be also noted that in commercial operation this process of ramping up and down can be repeated nearly indefinitely. This can result in significant wear and tear on the plant(s). These rapid and continual ramp ups and ramp downs can also cause the hydrogen plant to shut down due to the plant exceeding its thermodynamic design rate limitations. This can result in significant under production of hydrogen and cause excess flaring of hydrogen.

Referring again to FIG. 2a, there is an adverse event of unexpected pressure increase on the pipeline system as indicated in FIG. 1 by pressure transmitter "Pp". The first action that manual controllers or a supervisory control system analyzes is the current state of the underground hydrogen storage system as indicated in FIG. 1 by pressure transmitter "Pcav". If "Pcav" is less than the maximum allowable pressure within the cavern, then the next analysis to be performed is economical. If there are no economic constraints, hence, it is economically advantageous to inject surplus hydrogen into the hydrogen storage system, compared to manual operations or with automated control system operations, surplus hydrogen gets injected into the hydrogen storage system. Simultaneously, while hydrogen is being injected into the hydrogen storage system, either manually or through the use of an automatic control system, the $H_2$ Generation sources can be reduced or ramped down by reducing the flow of natural gas if the $H_2$ Generation source is a steam methane reformer or by reducing crude $H_2$ feed to a by-product source or PSA, such that the rate of changes at either source allows for optimum efficiency to be maintained. Both of these actions, hence reducing natural gas to a SMR or reducing feed to a PSA is common within the art.

Moreover, another example is the converse of the prior example, which is referenced in FIG. 2b, under scenario B. The same procedures are followed in the above example except that under this scenario the pressure is decreasing on the pipeline system. In either scenario, with manual controls and procedures or with an automated supervisory control system, optimum system efficiency can be maintained by the hydrogen generation sources by integrating the hydrogen system with a hydrogen storage system.

Figure 4:
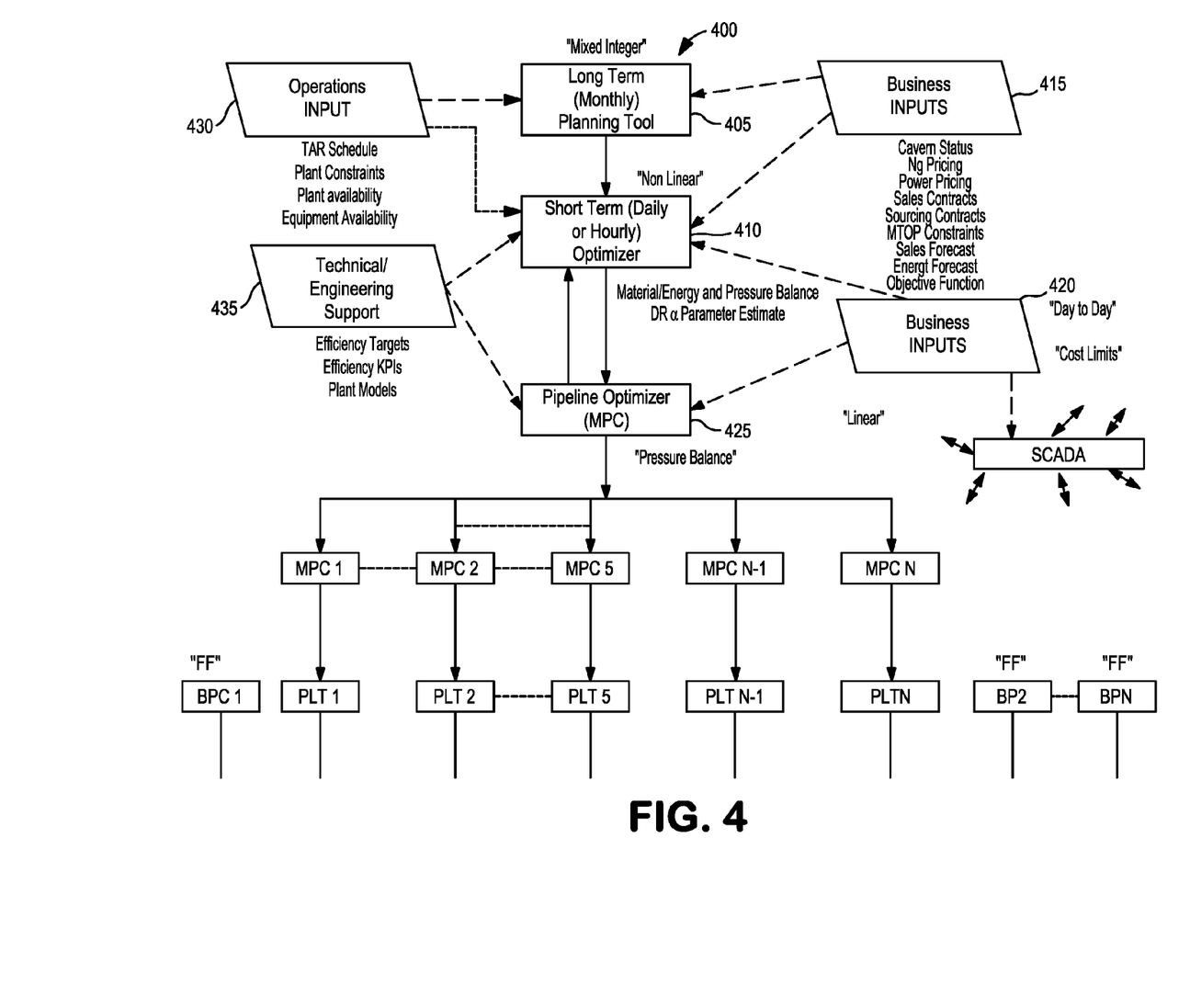
FIG. 4 is a detailed schematic of an advanced control system showing information flow as well as modules used for long term steady state monthly planning (or scenario generation), short term real-time optimization and a minute-to-minute optimizer that address dynamic changes in demand or supply via effective pressure control.

For illustrative purposes only, the computer system could include a CPU, data storage (e.g., a hard disk drive or network storage volumes), and memory capacity. The memory can include an operation optimizer software program which is one or more algorithms designed for operating the hydrogen plants individually and collectively in conjunction with the cavern in response to the input data. The operational features include controls of valves, rotating equipment or compressors and other means of turning up or down the plants. The computer system may also include a network interface used to connect the software to a network and input/output devices (e.g., a keyboard, mouse, and LCD or CRT display monitor, etc.) for observation and operation by operators. One of ordinary skill in the art will recognize that the computer system will have data input feeds from various sensors along the pipeline and with signals feeding the CPU and will be more complex than described herein. FIG. 4 shows the information flow required to do long term planning (or "what if" scenario generation), steady-state non-linear optimization as well as dynamic "pressure control" using constrained linear optimizer routines such as model predictive control algorithms.

In a more advanced methodology, and with reference to FIG. 4, an advanced control system (ACS) 400 can be used to automatically adjust key variables on the hydrogen production sources to optimize the process based on operational requirements while maintaining safety, purity, equipment and other process constraints. In the integrated advanced control system, several layers of advanced process control and optimization work synergistically across multiple time scales to generate a coordinated and systematic production schedule and strategy for multiple hydrogen production sources, based on inputs from business managers, production leaders, operations managers, technical and engineering support functions. At the highest level, a long term monthly planning tool 405 would allow business and operations managers to determine which production sources to utilize, based on forecasted sales demands and energy costs. The results of this planning and scheduling tool would be fed into a short-term hourly optimization application 410 that would take updated inputs from business and product inventory management 415, 420, and perform a system-wide optimization to minimize the variable margin or profit based on economic data. The results of this short-term optimization tool 410 would, in turn, be used as inputs to the individual plant and pipeline advanced process control systems 425 to drive the production facilities and pipeline control to the optimal targets. The advanced control layer would operate on a minute-by-minute time scale.

Considering a typical scenario when the sales organization provides sales forecast to the Product Manager (PM) at least 6-7 days before the front month begins. The PM will in turn source production that meets the sales forecast using the planning tool. This will encompass expected high level production rates for all on-purpose $H_2$ producing plants as well as the byproduct sources. The expected production rates then become an input to the Energy manager to nominate daily natural consumption for the front month. Turnaround schedules, plant constraints, equipment availability, etc. are Operations 430 and Technical/Engineering 435 inputs that will have an impact on the sourcing plan. Should the sales forecast be higher or lower than available production capacity, a decision has to be made on utilizing the cavern for export or import. It is noted that deviations from the daily nominations may incur penalties based on the NG contract. As the front month begins, all relevant data such as NG FOM and Gas Daily prices will be updated for use in the on-line applications that will make plant adjustments required to balance the pipeline pressure while meeting minimum delivery pressure constraints. The pipeline optimizer (PO) 425 employs a linear program algorithm in adjusting production rates as the demand changes. This is the dynamic portion of the system that ensures that demand changes are addressed on a minute-by-minute basis. The by-product sources are feedforward variables as they are not adjusted by the pipeline optimizer 425. The short term hourly optimizer (STO) 410 will then do further optimization utilizing the output of the economic optimization to adjust key parameters at each on-purpose production facility to optimize a variable margin objective function. These include $H_2$ production rates, steam production rates, key flow ratios that will optimize yields or product conversions while being subjected to system constraints. The STO application includes running high fidelity models, data reconciliation and parameter estimation and constrained nonlinear optimization routines modules. These modules are scheduled to run at a predetermined frequency. The output of the STO is sent to the PO for execution. In addition, the STO provide shadow price information that can be utilized by the Product manager, finance manager or other business managers for long term planning activities.

It should be apparent to those skilled in the art that the subject invention is not limited by the examples provided herein which have been provided to merely demonstrate the operability of the present invention. The scope of this invention includes equivalent embodiments, modifications, and variations that fall within the scope of the attacked claims.

What is claimed is:

1. A method of supplying high purity hydrogen through an integrated hydrogen system comprising in fluid flow communication one or more hydrogen storage caverns, multiple hydrogen production sources, and a hydrogen pipeline distribution system capable of providing the hydrogen to a plurality of hydrogen demand points, the method comprising:

obtaining real time input data regarding at least i) one or more operating conditions of the one or more hydrogen storage caverns including a current amount of hydrogen stored in the one or more hydrogen storage caverns, an economic value of the stored hydrogen inventory and the available storage capacity, ii) one or more operating conditions for each of the multiple hydrogen production sources including an actual plant hydrogen production rate of each hydrogen plant as measured in units of standard cubic feet per hour (scfh), iii) a production cost of each of the hydrogen production sources, measured in dollars, which incorporates all variable costs to operate each of said hydrogen production sources, including natural gas costs, feedstock costs, catalyst, emission penalties, emission credits, power and water costs, and iv) one or more demand requirements of the plurality of hydrogen demand points;

comparing the input data to an optimal storage capacity and available hydrogen of the one or more hydrogen storage caverns in real time, and adjusting at predetermined time intervals the operation of the integrated hydrogen system during demand periods such that during a low demand period any excess hydrogen can be compressed and injected into and stored within the hydrogen storage cavern and during a high demand period hydrogen can be withdrawn from the hydrogen storage cavern and introduced into the hydrogen pipeline distribution system, and maintaining an optimal hydrogen production rate for each of the multiple hydrogen production sources during operation such that each hydrogen production source operates substantially along an optimum efficiency curve and while transitioning during the low and high demand periods above, minimizing variable cost and/or maximizing variable margin;

wherein an economic objective function is optimized by adjusting production rates based on a given demand profile.

2. The method of claim 1 wherein the method attains and then adjusts in real time to respond to a dynamic demand profile.

3. The method of claim 1 wherein the input data includes pressure readings.

4. The method of claim 1 wherein the predetermined time intervals are 30 minutes or less.

5. The method of claim 4 wherein the predetermined time intervals are 5 minutes or less.

6. The method of claim 1 wherein the input data is received in time intervals of one minute or less.

7. The method of claim 1 wherein a computerized control system is used for obtaining, comparing and then adjusting the hydrogen integrated supply system in real time.

8. The method of claim 1 wherein the cavern is safeguarded and avoids an over pressurization condition from geologically induced creep closure effects.

9. The method of claim 1, supplying hydrogen from a salt cavern through the integrated hydrogen system to counter act the effects of abnormally high internal cavern pressure caused by geologic creep closure.

10. The method of claim 1, further comprising eliminating flaring of hydrogen and/or cause the operation of the plants under conditions that are outside the range of their peak operating efficiency as measured by the amount of energy consumed divided by the quantity of hydrogen produced.

11. The method of claim 1, further comprising utilizing downhole gauges to monitor a pressure at a casing shoe.

12. The method of claim 1, further minimizing any economic penalties associated with various hydrogen feed stock purchase agreements or natural gas feed stock purchase agreements.

13. The method of claim 1, further economically arbitraging hydrogen feed stock purchase agreements and or natural gas feed stock purchase agreements.

14. The method of claim 11, further comprising supplying hydrogen from the cavern through the integrated hydrogen system, thereby adjusting the pressure in response to the monitored allows the plants to operate under conditions within the range of peak operating efficiency.

15. The method of claim 1, wherein a natural gas imbalance penalty is minimized in the economic objective function.

* * * * *